United States Patent [19]

Jones et al.

[11] Patent Number: 4,837,777
[45] Date of Patent: Jun. 6, 1989

[54] PRESSURE OR TEMPERATURE TRANSDUCER

[76] Inventors: Norman B. Jones; George Papageorgiou, both of The University, Leicester, Department of Engineering, The University of Leicester, United Kingdom, LE1 7RH

[21] Appl. No.: 827,260
[22] PCT Filed: May 22, 1985
[86] PCT No.: PCT/GB85/00216
 § 371 Date: Jan. 27, 1986
 § 102(e) Date: Jan. 27, 1986
[87] PCT Pub. No.: WO85/05678
 PCT Pub. Date: Dec. 19, 1985

[30] Foreign Application Priority Data
 May 29, 1984 [GB] United Kingdom ............... 8413650

[51] Int. Cl.$^4$ ............... G01J 05/00; G01N 07/00; G01N 25/00
[52] U.S. Cl. ............... 374/142; 73/705; 128/736; 250/231 P; 250/577; 356/375; 374/143
[58] Field of Search ............... 374/131, 143; 73/705, 73/293, 327; 128/667, 675, 634; 250/577, 231 P; 356/44, 436, 373, 375

[56] References Cited

U.S. PATENT DOCUMENTS

| | | | |
|---|---|---|---|
| 2,984,148 | 5/1961 | Vollmer | 73/705 X |
| 3,025,405 | 3/1962 | Dadas | 73/705 |
| 3,209,596 | 10/1965 | Kelly | 73/705 |
| 3,215,135 | 11/1965 | Franke | 128/675 |
| 3,273,447 | 9/1966 | Frank | 73/705 X |
| 3,498,141 | 3/1970 | Nelson et al. | 73/327 X |
| 4,118,983 | 10/1978 | Brazhnikov | 73/290 V |
| 4,156,149 | 5/1979 | Vaccari | 250/577 |
| 4,176,551 | 12/1979 | Hammer et al. | 374/161 |
| 4,281,245 | 7/1981 | Brogardh et al. | 250/205 X |
| 4,448,207 | 5/1984 | Parvish | 73/290 V X |
| 4,476,870 | 10/1984 | Peterson et al. | 128/665 X |
| 4,594,504 | 6/1986 | Coursolle et al. | 250/231 P X |
| 4,631,401 | 12/1986 | Parkhurst et al. | 250/231 P X |

Primary Examiner—Daniel M. Yasich
Attorney, Agent, or Firm—Eugene J. A. Gierczak

[57] ABSTRACT

A transducer to measure pressure or temperature comprising a quantity of compressible material such as gas and a quantity of incompressible material such as liquid and proper means (16,17) to detect volume and interface(s) (14) changes of said compressible material induced by pressure or temperature variation. Radiation may be used to detect said changes. Both source (16) and detector (17) of radiation may be separated from said compressible and incompressible materials using appropriate waveguides (10,11) thus allowing for transducer miniaturization. The only deformable element of the transducer is said compressible material, every other part of it being substantially rigid this feature offering robustness and simplicity of construction. Provision is made for the in-situ calibration and flushing of the instrument when required.

26 Claims, 4 Drawing Sheets

PRESSURE OR TEMPERATURE TRANSDUCER

DESCRIPTION

1. Technical Field.

This invention relates to transducers for measuring pressure or temperature.

2. Background Art.

Pressure transducers are well known instruments with a wide variety of applications. They usually comprise a chamber, often cylindrical, with one side occupied by an elastic diaphragm. The deformation of the diaphragm caused by the pressure under measurement if sensed in various ways depending on the principle of the transducer. However transducers whose function is based on the deformation of a diaphragm present several problems. This is because the diaphragm material and thickness are important factors determining the transducer performance and require meticulus care and also the secure mounting of the diaphragm at the appropriate site is an elaborate task given the small dimensions of these instruments.

Temperature transducers are usually based on the thermoelectric phenomenon (thermocouples), or the phenomenon of thermally affected resistance, or the thermal expansion phenomenon whereby the change in dimension of a medium is monitored. This medium can be either liquid or solid. In the case of solid mediums they are sometimes of the form of a diaphragm whose shape depends on the temperature. In this later case identical problems to the ones mentioned above are encountered especially for miniaturised diaphragm-type temperature transducers.

DISCLOSURE OF INVENTION

According to the present invention there are provided transducers of simple construction capable of measuring pressure or temperature. They comprise, according to one embodiment of the present invention, a quantity of compressible deformable material, a quantity of gas for example, or combination of materials forming a compressible deformable structure; and a quantity of essentially incompressible deformable material such as liquid or gel, for example. The compressible deformable material or the combination of materials forming a compressible deformable structure will be referred to throughout the rest of the present description, up to and including the part "Industrial Applicability", as "gas", and the essentially incompressible deformable material will be referred to throughout the rest of the present description up to and including the part "Industrial Applicability", as "liquid".

The gas is either concentrated in one volume or dispersed in a number of volumes so as to form one or more interface(s) with the liquid. Pressure and/or temperature variations of the liquid alter the volume and/or the geometry of the gas. Near the gas and the liquid are proper means for detection to sense the changes in the gas volume and/or the geometry of the gas interface(s) with the liquid. These changes are induced by the physical quantity under measurement (pressure or temperature). When pressure is measured the liquid communicates with the pressure source and its temperature should be kept constant or be continuously monitored. When temperature is measured the liquid communicates with a source of constant or continuously monitored pressure. The only deformable element of the transducer is the gas, every other part of it being substantially rigid.

Electrolytic, chemical or physical methods can be used to introduce or generate the gas. By way of example reference is made to some appropriate methods. As an example of an electrolytic method, two electrodes are placed at appropriate positions in the liquid and an electric current passes through the liquid, which in this case is electrically conductive. By proper selection of the chemical composition of the electrodes and the electrically conductive liquid, gaseous substance is formed on the surface of the electrodes, the gaseous substance being in this case the compressible deformable material or combination of materials forming a compressible deformable structure.

As an example of a chemical method, a properly selected chemical substance is placed at appropriate place(s) either on the surface of the appropriate means for detection referred to above or on the surface of a body or bodies introduced at appropriate place(s) in the proximity of the appropriate means for detection. The liquid is subsequently put into place so that it comes into contact with the chemical substance which can be concentrated in one place or divided into a number of quantities deposited in more than one place. If the liquid has in this case a properly selected chemical composition, chemical reaction(s) can occur between the liquid and the chemical substance. Having properly selected the exact chemical composition of the liquid and the chemical substance, product(s) of the chemical reaction(s) are of gaseous nature and remain, especially if produced in small quantities, close to the place(s) of their production. The chemical reaction(s) can occur either spontaneously or upon action of appropriate factors such as heat or other radiation of any type, for example. Said gaseous substance is in this case the compressible deformable material or combination of materials forming a compressible deformable structure.

As an example of a physical method, the whole assembly is placed in a gaseous atmosphere and pressurised. One or more small container(s) containing gaseous substance and bearing one or more small opening(s) are placed at some place(s) in the proximity of the appropriate means for detection. Then the liquid is put into place. The liquid, due to the small dimensions of the container(s) and their opening(s), cannot completely displace the gaseous substance from within the containers. After introduction of the liquid, depressurising the whole assembly part of the gaseous substance, which in this case is the compressible deformable material, comes out of the continer(s) and remains in the proximity, thus forming one or more interface(s).

BRIEF DESCRIPTION OF DRAWINGS

In the present part, by way of example only, radiation is used to detect changes of volume of the gas and/or changes of geometry of the interface(s) between the gas and said liquid. Throughout this disclosure the term radiation refers to any type of electromagnetic radiation or any other type of wave and the term waveguide includes any type of optical fibre or any other system through which electromagnetic radiation or any other type of wave is capable of travelling. For the purpose of promoting a better understanding of the principles of the invention particular arrangements will now be described by way of example with reference to the accompanying drawings in which.

It will nevertheless be understood that no limitation of the scope of the invention is thereby intended and that the figures presented are merely examples of the many more embodiments that the invention can assume.

Figure 1:
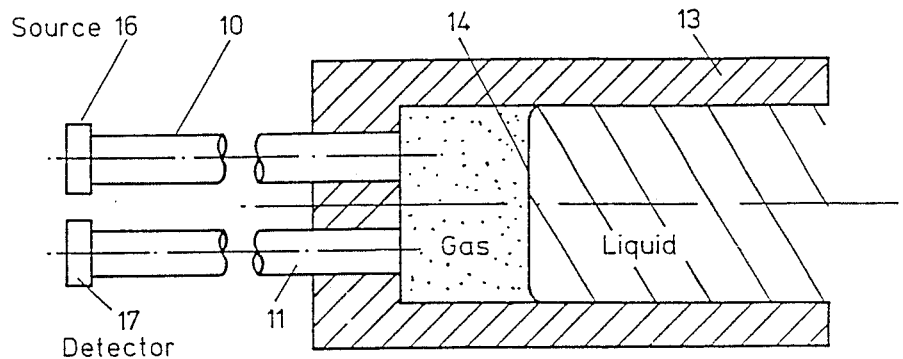
FIGS. 1-4 are longitudinal sectional views of transducer embodiments differing in the way the gas quantity is irradiated and the way the radiation is detected.

Referring to FIG. 1 the transducer comprises a cylindrical chamber 13, with one end open. Two waveguides, namely a launching waveguide 10 and a detecting waveguide 11, transverse the closed end of said chamber. There is a gas-liquid interface 14 at some distance from the chamber's closed end. The liquid traps and surrounds the gas adjacent the closed end of the chamber. The shape of the interface depends on the material of the chamber. Radiation generated by a proper source 16 and transmitted through the launching waveguide is reflected and/or refracted at the gasliquid interface and a fraction of the radiation is transmitted back by the detecting waveguide to a proper detector 17 of the radiation. Pressure or temperature variations alters the volume of the gas quantity and deforms the gas-liquid interface and consequently the detected radiation changes. Due to this change of radiation the detector produces an electrical signal which is subsequently amplified and/or displayed and/or otherwise processed.

Figure 2:
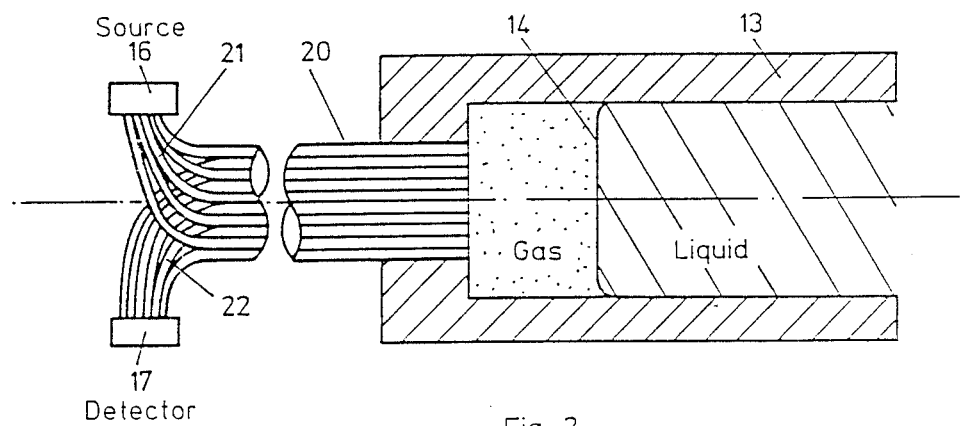

Referring to the embodiment of FIG. 2 the arrangement is similar to that of FIG. 1 but the two waveguides of FIG. 1 have been replaced by a bundle 20 of waveguides. At some distance from the chamber the bundle splits into the launching bundle 21 and a detecting bundle 20 22.

Figure 3:
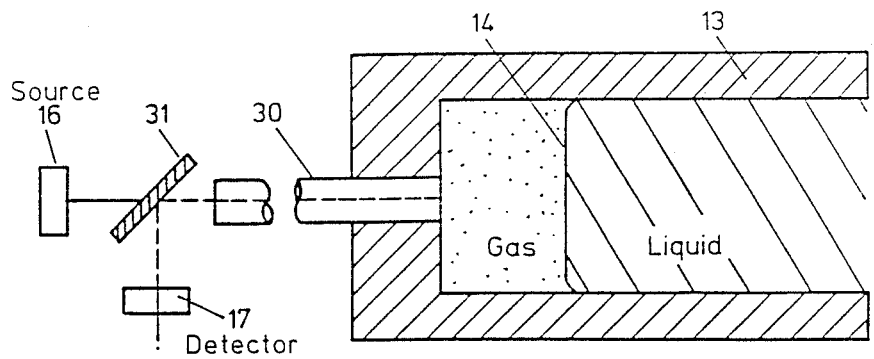

Referring to FIG. 3 a arrangement differs from that of FIG. 1 in that the two waveguides of FIG. 1 have been replaced by a single waveguide 30. The single waveguide serves both to irradiate the chamber with radiation of a proper source 16 and to transmit back changes of radiation to a proper detector 17. A semitransparent mirror 31 or any other device having a similar action (a beam splitter) separate the two waves of opposite directions namely the radiation from the source and the radiation to the detector.

Figure 4:
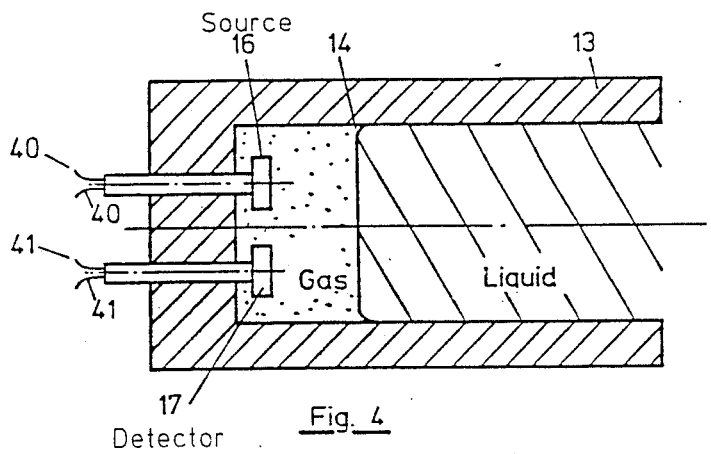

Referring to FIG. 4 the arrangement is similar to that of FIG. 1. However the launching and detecting waveguides are absent and the radiation source 16 and the radiation detector 17 are placed within the chamber 13. Electrical cables 40 and 41 are connected to the source and the detector.

Figure 5:
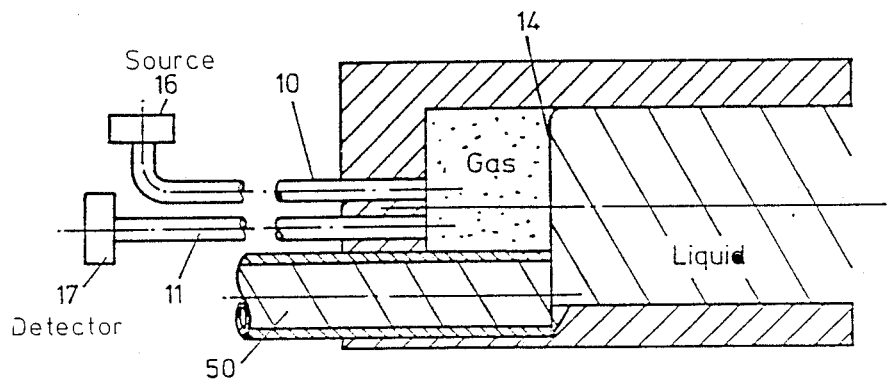
FIG. 5 is another longitudinal sectional view and shows an arrangement similar to that of FIG. 1 but including an accessory tube.

Referring to FIG. 5 the, arrangement is similar to that of FIG. 1 but an accessory tube 50 is added. The accessory tube crosses the closed end of the chamber and terminates at some distance from the end. This accessory tube is particularly useful when pressure measurement is required and serves initially to form the gas-liquid liquid interface and subsequently to maintain a flow of liquid in order to keep the transducer clear of debris at the open end. A flushing liquid may be required, for example, when intravascular blood pressure is measured, to prevent formation of blood clots. The accessory tube can be used for in-situ calibration of the transducer (mean pressure determination) by connecting it to a reference manometer. The initial formation of the gas-liquid interface should be carried out before any pressure measurements and the transducer placed in position subsequently.

In the same way as the embodiment of FIG. 5 was derived from the embodiment of FIG. 1, three further embodiments can derive from FIGS. 2,3 and 4 having the additional element of the accessory tube 50 as described above in the embodiment of FIG. 5.

Figure 6:
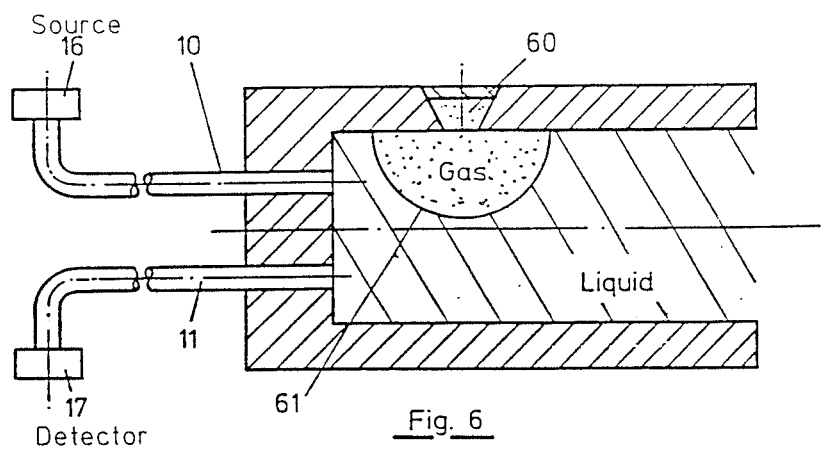
FIGS. 6 and 7 are longitudinal sectional views of additional embodiments of the transducer with changes in the details of the chamber containing the gas and liquid quantities.

The embodiment of the transducer illustrated in FIG. 6 resembles that of FIG. 1, the difference being in the gas-liquid interface configuration. In the present embodiment there is a recess 60 communicating with the lumen of the chamber at some point via the internal surface of the chamber and accommodating part of the gas quantity. The rest of the gas quantity protrudes outside the recess and occupies part of the chamber lumen forming a gas-liquid interface 61. Three additional embodiments can be derived by combining the gas-liquid interface represented in FIG. 6 with the different ways of irradiating the chamber represented in FIGS. 2,3 and 4, namely waveguide bundle, single waveguide and irradiating and detecting devices contained within the chamber. When pressure measurement is required, an accessory tube, as in the embodiment of FIG. 5, may be combined with all four arrangements described in the present paragraph. The purpose of the accessory tube is to calibrate the instrument and/or flush the chamber and/or help in the meniscus forming process.

Figure 7:
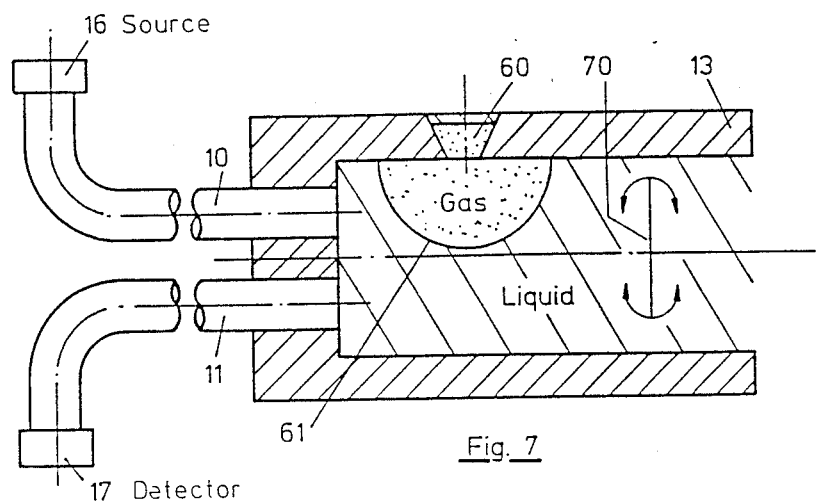

Referring to FIG. 7, the one additional characteristic with respect to the arrangement of FIG. 6 is a reflecting or diffusing surface 70, placed at some distance beyond the recess towards the chamber open end in such a manner that it does not occlude the lumen of the chamber. The gas-liquid interface lies between the waveguide tips and the surface. Radiation transmitted through said launching waveguide is reflected or diffused back by the surface 70. The quantity of radiation detected changes with the change of volume of the gas quantity which depends on pressure or temperature. Further embodiments can be derived by either using the different ways of irradiating the chamber as in FIGS. 2,3 and 4 and/or including in all the newly derived embodiments the accessory tube described in detail in the arrangement of FIG. 5. The accessory tube is more likely to be useful in the case of pressure transducers.

Figure 8:
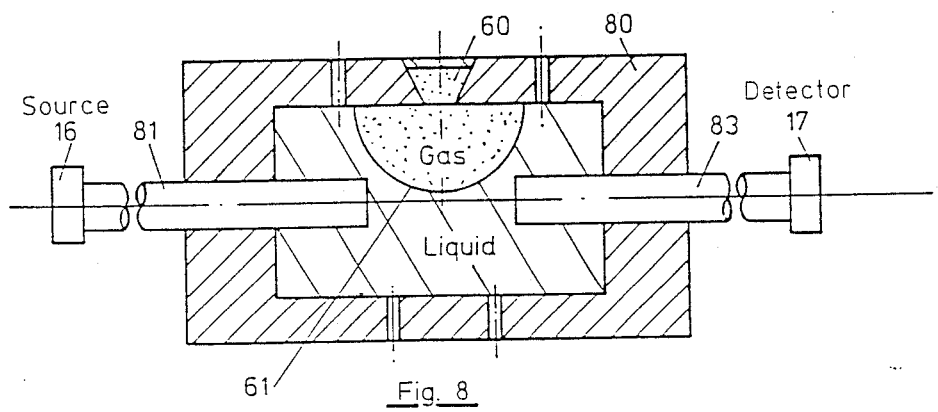
FIGS. 8-11 are longitudinal sectional views of further embodiments of the transducer.

Referring to FIG. 8, the transducer comprises a cylindrical chamber 80 with both ends closed, one end being transversed by a launching waveguide 81, coupled to a proper radiation source 16 and the other end being transversed by a detecting waveguide 83 coupled to a proper detector 17. The chamber wall has a number of openings and a small recess to accommodate part of gas quantity, the rest of which protrudes into the lumen of the chamber between the two waveguide tips. The rest of the space of the chamber is occupied by liquid.

Figure 9:
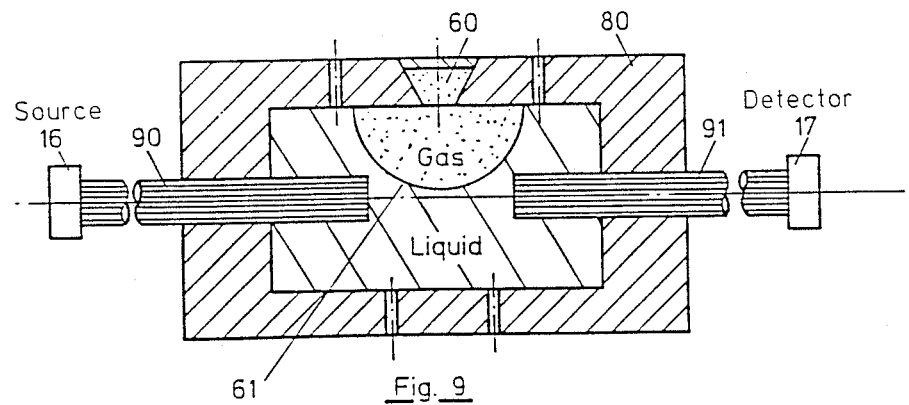

The only difference between the arrangement of FIG. 9 and that of FIG. 8 is that in the former the two waveguides has been replaced by two bundles of waveguides of radiation namely the launching bundle 90 and the detecting bundle 91.

Figure 10:
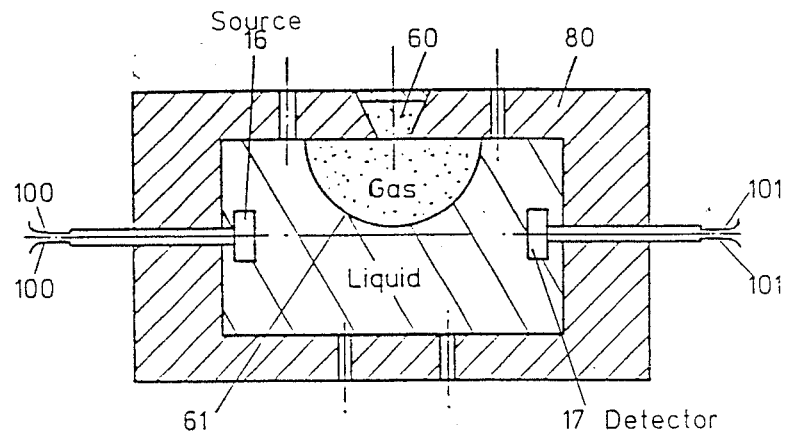

Referring to FIG. 10, the waveguides of radiation are absent and both the source and the detector of radiation are placed within the said chamber 80. Electrical cables 100 and 101 are connected to the source and the detector.

Three further embodiments of the invention can be derived by connecting an accessory tube to the chamber 80 in the arrangements of FIGS. 8,9 and 10. The utility of the accessory tube refers mainly to pressure measurements and has been analysed in the arrangement of FIG. 5.

Figure 11:
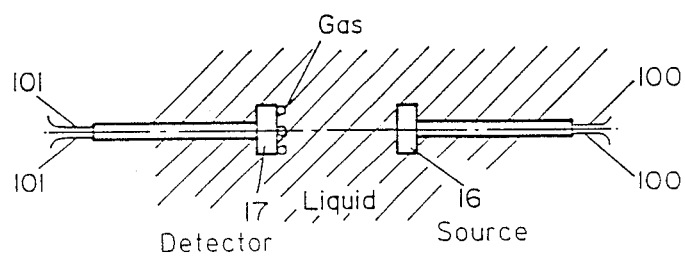

According to the embodiment of FIG. 11, a number of gas volumes is deposited on the surface of radiation detector 17 placed near the radiation source 16. Liquid surrounds the gas and the radiation source and the detector. Electrical cables 100 and 101 are connected to said source and detector.

An alternative embodiment to FIG. 11 would involve the gas volumes being on the surface of the radiation source. The liquid traps and surrounds the gas volumes adjacent the radiation detector 17 or radiation source 16.

Alternative embodiments to all those considered involve either the source or the detector but not both being close to the gas volume(s) and the other being communicated with via waveguide(s).

MODES OF CARRYING OUT THE INVENTION.

The embodiments referring to FIG. 1 and 11.

INDUSTRIAL APPLICABILITY.

The rationale for the development of these transducers is the need for simple, efficient, low cost and possibly disposable transducers for the measurement of pressure or temperature. Another desirable characteristic is small size especially for physiological pressure measurements either centrally or peripherally (microcirculation). Disposability is a particularly desirable characteristic especially in the medical field as it reduces the patients risk of catheter-induced infections and eliminates cumbersome sterilizing procedures. An additional advantage of the disclosed transducers in the biomedical field is its freedom, in many embodiments, from electrical potential that under certain circumstances could harm the patient especially in cases of intracardiac pressure measurements.

The disclosed transducers could also find applications in industrial situations where small dimensions and robust construction is required in order to measure pressure or temperature or provide indication of pressure or temperature variation.

We claim:

1. A transducer for monitoring pressure or temperature changes, said transducer comprising: a compressible first body means; liquid means trapping said compressible first body means so as to define an interface with said first body means whereby the position of said interface is responsive to said temperature or the pressure change of said first body means transmitted to said compressible first body means by said said liquid means; means for transmitting radiation to said interface; and means for detecting said transmitted radiation from said interface whereby the proportion of radiation transferred from said transmitting means to said detector means is a function of the position of said interface in response to said pressure or temperature changes.

2. A transducer according to claim 1 wherein said compressible first body means is a gas.

3. A Transducer according to claim 2 wherein said gas is disposed adjacent said receiving means.

4. A transducer according to claim 2 wherein said gas is disposed adjacent said transmitting means.

5. A transducer according to claim 2 further comprising a substantially rigid chamber containing said gas means and said liquid means; and means enabling communication of said gas means and said liquid means in said chamber with a source of pressure.

6. A transducer according to claim 5 for measuring temperature wherein said source of pressure is substantially constant.

7. A transducer according to claim 5 for measuring pressure.

8. A transducer according to claim 5, wherein said means for transmitting and receiving said radiation are located within said chamber.

9. A transducer according to claim 5 wherein said transmitting means and said detector means comprise waveguide means.

10. A transducer according to claim 9 wherein said radiation is transmitted towards said interface and said transferred radiation is transmitted to said detector means along a common waveguide means.

11. A transducer according to claim 5 further comprising a means for deflecting said transmitted radiation towards said receiving means, and wherein said interface is located in the path of said transmitted radiation intermediate said deflecting means and said detector.

12. A transducer according to claim 11 wherein said deflecting means is operable to diffuse said radiation.

13. A transducer according to claim 5 wherein said chamber has at least one recess means which at least partially accommodates said gas.

14. A transducer according to claim 5 further comprising an accessory tube means connected to said chamber for forming said interface.

15. A transducer according to claim 5 wherein said accessory tube means is connected to said chamber for maintaining a flow of said liquid through said chamber.

16. A transducer according to claim 5 further comprising an accessory tube means connected to said chamber for calibrating said transducer by connecting said accessory tube to a reference manometer.

17. A transducer according to claim 1 wherein said interface is formed at a preselected location along a catheter or needle.

18. A transducer according to claim 1 further comprising waveguide means for transmitting said radiation towards said interface and transmitting said transferred radiation to said detector means.

19. A transducer according to claim 18 wherein said radiation is transmitted towards said interface and said transferred radiation is transmitted to said receiving means along a common waveguide means.

20. A transducer according to claim 1 further comprising a means for deflecting said transmitted radiation towards said detector means, and wherein said interface is located in the path of said transmitted radiation intermediate said deflecting means and said receiving means.

21. A transducer according to claim 20 wherein said deflecting means is operable to diffuse said radiation.

22. A transducer for selectively measuring pressure or temperature changes, said transducer comprising: a compressible first body means; liquid means trapping said compressible first body means so as to define at least one interface with said first body means wherein the volume of said first body means and geometry of said interface is responsive to said temperature or pressure changes of said first body means transmitted to said first body means by said liquid means; means for transmitting radiation to said interface and means for detecting said transmitted radiation from said interface so as to measure said pressure or temperature as a function of said volume of said first body means and geometry of said interface.

23. A transducer according to claim 22 including a chamber for containing said first body means and said liquid means, said chamber communicating openly with a pressure source when pressure is measured and said chamber communicating with a source of substantially constant pressure when temperature is measured.

24. A transducer for sensing a selected condition comprising:
(a) a chamber having a closed end and an open end;
(b) gas means disposed within said chamber means;
(c) liquid means trapping said gas means in said chamber means so as to define an interface with said gas means, said liquid means communicating with said open end of said chamber whereby the position of said interface in said chamber is responsive to said condition being sensed at said open end;
(d) means traversing said closed end of said chamber for transmitting radiation to said interface;
(e) means traversing said closed end of said chamber for detecting transmitted radiation from said interface so as to sense said selected condition as a function of the position of said interface.

25. A transducer as claimed in claim 24 wherein said transducer senses pressure changes at said open end.

26. A transducer as claimed in claim 24 wherein said transducer senses temperature changes at said open end.

* * * * *